Figure 1:
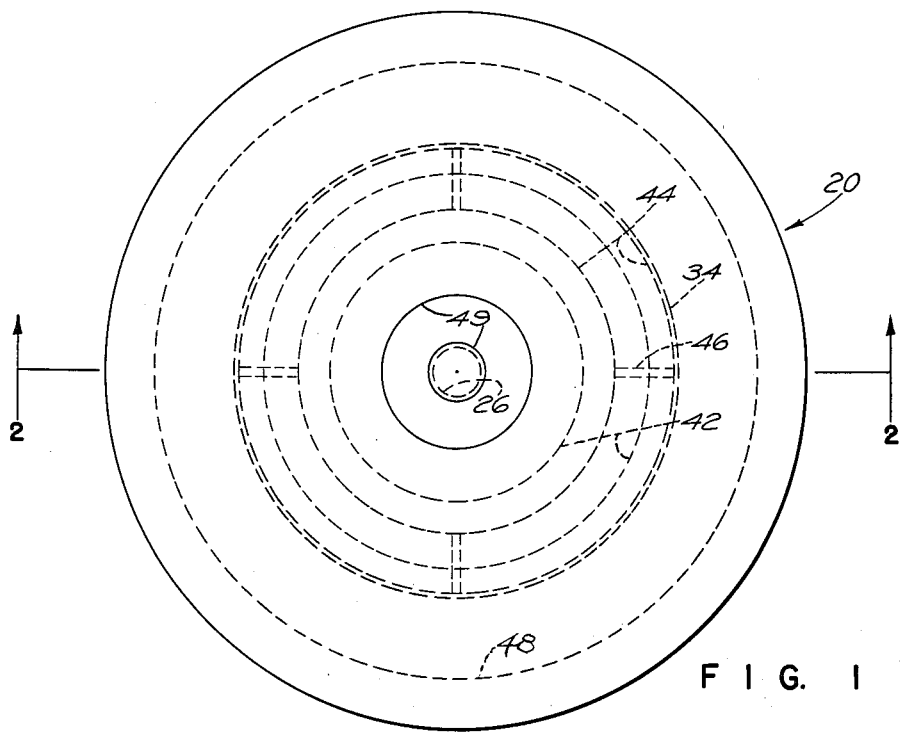

March 7, 1961 W. T. FOREMAN ET AL 2,973,585
SPIRIT LEVEL
Filed May 2, 1958

INVENTORS
William T. Foreman
BY Jeremiah J. Vanning
Morse & Altman

United States Patent Office 2,973,585
Patented Mar. 7, 1961

2,973,585

SPIRIT LEVEL

William T. Foreman, Lexington, and Jeremiah J. Fanning, Maynard, Mass., assignors to Baird-Atomic, Inc., Cambridge, Mass., a corporation of Massachusetts Filed May 2, 1958, Ser. No. 732,689

7 Claims. (Cl. 33—212)

The present invention relates to levels for indicating the degree of deviation from horizontal, for example, in conjunction with sextants, transits and the like and, more particularly, to so-called spirit levels of the type comprising a bubble visible beneath a concave surface in reference to suitable indicia for orientation along two co-ordinates.

The choice of an optimum bubble size is an important design consideration that influences the utility and sensitivity of a spirit level, i.e. the ease with which it may be read and the rapidity with which it responds to changes in orientation. Generally, the size of the bubble tends to be influenced in part by ambient conditions. Thus, if the bubble chamber is fixed in volume and confines therein a fixed quantity of liquid, expansion of the liquid in response to temperature increase will reduce the size of the bubble or cause it to disappear altogether and, contraction of the liquid in response to temperature decrease will increase the size of the bubble so that, for example, its relationship to the indicia may be difficult to determine. It is desired to maintain the bubble substantially at an optimum size throughout a wide range of temperature and pressure conditions. The present invention contemplates a novel spirit level having a bubble of practically constant volume and characterized by a few simple interrelated components that are compactly fabricated.

The primary object of the present invention is to provide such a spirit level comprising, as interrelated compensating components, solid external means defining a chamber, and within the chamber, liquid means providing a bubble and solid internal means immersed in the liquid, the liquid region that contains the bubble communicating with remaining liquid regions through constricted vents that are prevented from passing the bubble, for example, by surface tension. In order that the volume of the bubble remain constant, the materials and volumes of the external solid means, the liquid means and the internal solid means are so selected that for an incremental change in temperature, an incremental change in chamber volume is accompanied by a like incremental change in the sum of the volumes of the liquid means and the internal solid means.

Other objects of the present invention will in part be obvious and will in part appear hereinafter.

The invention accordingly comprises the product possessing the construction, combination of elements and arrangement of parts, which are exemplified in the following detailed disclosure and the scope of which will be indicated in the appended claims.

Figure 2:
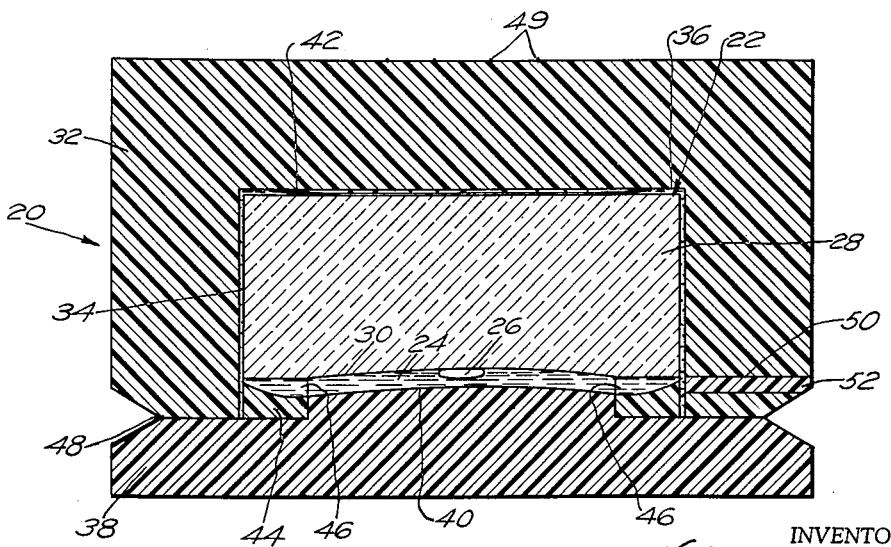

For a fuller understanding of the nature and objects of the present invention, reference should be had to the following detailed description taken in connection with the accompanying drawing wherein:

Figure 1 is a top plan view of a spirit level embodying the present invention; and Fig. 2 is a cross sectional view of the spirit level of Fig. 1, the section being taken substantially along the line 2—2.

The illustrated embodiment of the invention comprises external solid means including a housing 20 of continuous or uninterrupted rigidity defining a chamber 22, fluid means including a mobile liquid 24 providing a bubble 26 and internal solid means including a lens 28 providing a curved surface 30 for constraining bubble 26. Housing 20 includes an inverted container portion 32 and a base portion 38. Container portion 32 presents a cylindrical peripheral wall 34 and an upper planar wall 36. Base portion 38 presents a medial platform 40 that projects into cavity 22 and that presents an upper surface 40. Lens 28 presents a cylindrical peripheral wall 35 and an upper planar wall 36 that respectively are contiguous to cylindrical peripheral wall 34 and planar wall 36 of container portion 32. Usually cylindrical peripheral wall 35 and planar wall 37 respectively are spaced from peripheral wall 34 and planar wall 36 by distances in the range of from five to ten thousandths of an inch. Lens 28 is resiliently pressed downwardly against a ring 44, which constitutes part of the external solid means, by a spring 42, which constitutes part of the internal solid means. The lower portions of ring 44 encompass platform 40. Ring 44 is provided with a plurality of vents 46, which permit liquid 24 but not bubble 26 to pass freely from between surfaces 30 and 40 into the regions between the contiguous surfaces of container portions 32 and lens 28. The mouth of each vent 46 adjacent to the bubble region preferably has at least one diameter within the range of from five to thirty thousandths of an inch. The position of bubble 26 is read, for example, in relation to suitable indicia 49 on housing 20.

Specifically, in the illustrated embodiment, container portion 32, base portion 38 and ring 44 are composed of an organic plastic such as methyl methacrylate, liquid 24 is composed of an organic liquid such as heptane, bubble 26 is composed of a gas such as air, or vapor from the organic liquid, lens 28 is composed of a transparent inorganic non-metal such as glass, and spring 42 is composed of a metal such as steel. For an incremental change in temperature, the thermal bulk coefficient of expansion ($B_l$) of heptane is greater than the thermal bulk coefficient of expansion ($B_p$) of methyl methacrylate and the latter is greater than the thermal bulk coefficient of expansion ($B_g$) of glass. Or, $B_l > B_p > B_g$. As indicated above, the respective volumes at some reference temperature, for example, room temperature, are so chosen that for an incremental change in temperature, the incremental change in the volume of cavity 22 is equal to the incremental change in the volume of liquid 24 minus the incremental change in the volume of the components immersed in liquid 24, viz., lens 28 and spring 42.

The components are assembled as follows. Before the heptane is introduced, the lower flat face of ring 44 and the lower flat face of container portion 32 are cemented to the upper flat face of vase 38 and 48, with spring 42 and lens 28 in proper positions. Then, through an opening 50 in container portion 32, cavity 22 is alternately evacuated and repressurized with heptane until full. Thereafter a fluid is introduced through an extremely thin needle to form bubble 26. Finally opening 50 is sealed with cement to form a plug 52.

Mathematically, the components of the illustrated spirit level are related as follows:

$$V_p B_p - V_g B_g - V_l B_l = 0$$

when the volumes are related by $$V_p = V_a + V_g + V_l$$

where:

$V_p$ is the gross volume within cavity 22;
$V_1$ is the gross volume of liquid 24;
$V_g$ is approximately the volume of lens 28 and spring 42, and, more generally, the sum of the volumes of the internal solid means;
$V_a$ is the volume of bubble 26;
$B_p$ is the bulk coefficient of thermal expansion for the material of housing 20, more generally, the weighted average bulk coefficient of the materials (where different) of the external solid means defining cavity 22;
$B_l$ is the bulk coefficient of thermal expansion for the material of liquid 24; and
$B_g$ is approximately the bulk coefficient of thermal expansion for the materials of lens 28 and spring 42 (which have similar bulk coefficients) more generally, the weighted average bulk coefficient of the materials of the internal solid means.

It will be appreciated that the weighted average bulk coefficient of several components may be defined as:

$$B_{1,2\ldots n} = \frac{B_1 V_1 + B_2 V_2 \ldots + B_n V_n}{V_1 + V_2 \ldots + V_n}$$

where the subscripts 1, 2 and $n$ refer to a first, a second and an $n$th component respectively.

In practice one would not expect to achieve perfect compensation for a wide range of temperatures because the bulk coefficients of the various components are not absolutely constant at all temperatures. However, for a spirit level made with the aforementioned materials, changes in bubble diameter have been reduced to less than 10 percent over the range from $+50°$ to $-50°$ C.

Since certain changes may be made in the above described device without departing from the scope of the invention herein involved, it is intended that all matter contained in the above description and shown in the accompanying drawings be interpreted in an illustrative and not in a limiting sense.

What is claimed is:
1. A spirit level comprising, as interrelated components, solid external means defining a chamber, and within said chamber, liquid means providing a bubble and solid internal means immersed in said liquid means, the region of said liquid means containing said bubble communicating with remaining regions of said liquid means through constricted vents that are prevented from passing said bubble, said means being related as follows:

$$V_p B_p - V_g B_g - V_l B_l = 0$$

when the volumes are related by $$V_p = V_a + V_g + V_l$$

where:

$V_p$ is substantially the volume within said chamber;
$V_l$ is substantially the volume of said liquid means;
$V_g$ is substantially the volume of said internal solid means;
$V_a$ is substantially the volume of said bubble;
$B_p$ is substantially the weighted average bulk coefficient of thermal expansion of said external means;
$B_l$ is substantially the bulk coefficient of thermal expansion of said liquid means; and
$B_g$ is substantially the weighted average bulk coefficient of thermal expansion of said internal means.

2. The spirit level of claim 1 wherein said external solid means contains primarily an organic plastic, said liquid means contains primarily an organic liquid and said internal solid means contains primarily an inorganic material.

3. The spirit level of claim 1 wherein said external solid means contains methyl methacrylate, said liquid means contains heptane, said bubble contains air and said internal solid means includes a glass lens and a steel spring.

4. The spirit level of claim 1 wherein the materials and volumes of said external solid means, said liquid means, and said internal solid means are so selected that for an incremental change in temperature, an incremental change in chamber volume is accompanied by a like incremental change in the sum of the volumes of said liquid means and said internal solid means.

5. A spirit level comprising, as interrelated components, solid external means defining a chamber, and within said chamber, liquid means providing a bubble and solid internal means immersed in said liquid means, the region of said liquid means containing said bubble communicating with remaining regions of said liquid means through constricted vents that prevent the passage of said bubble but permit the passage of said liquid means, said external solid means containing methyl methacrylate, said liquid means containing heptane and said internal solid means including a glass lens and a steel spring.

6. A spirit level comprising, as interrelated components, solid external means defining a chamber, and within said chamber, liquid means providing a bubble and solid internal means immersed in said liquid means, the region of said liquid means containing said bubble communicating with remaining regions of said liquid means through constricted vents that are prevented from passing said bubble, said internal solid means being resiliently biased against said external solid means.

7. A spirit level comprising, as interrelated components, solid external means defining a chamber, and within said chamber, liquid means providing a bubble and solid means immersed in said liquid means, the region of said liquid means containing said bubble communicating with remaining regions of said liquid means through constricted vents that prevent the passage of said bubble, first surfaces of said external solid means and said internal solid means defining said region of said liquid means containing said bubble, second regions of said external means and said internal means defining said remaining regions of said liquid means, the quantity of said region of said liquid means containing said bubble being greater than the quantity of said remaining regions of said liquid means, second surfaces of said external solid means and said internal solid means being less than 10,000ths of an inch apart.

References Cited in the file of this patent

UNITED STATES PATENTS 2,356,311   Geier _____ Aug. 22, 1944

FOREIGN PATENTS 456,272   Great Britain _____ Nov. 5, 1936